Dec. 31, 1940.　　A. T. SCOTT ET AL　　2,227,203
MANUFACTURE OF SOAP
Filed Nov. 5, 1938　　2 Sheets-Sheet 1
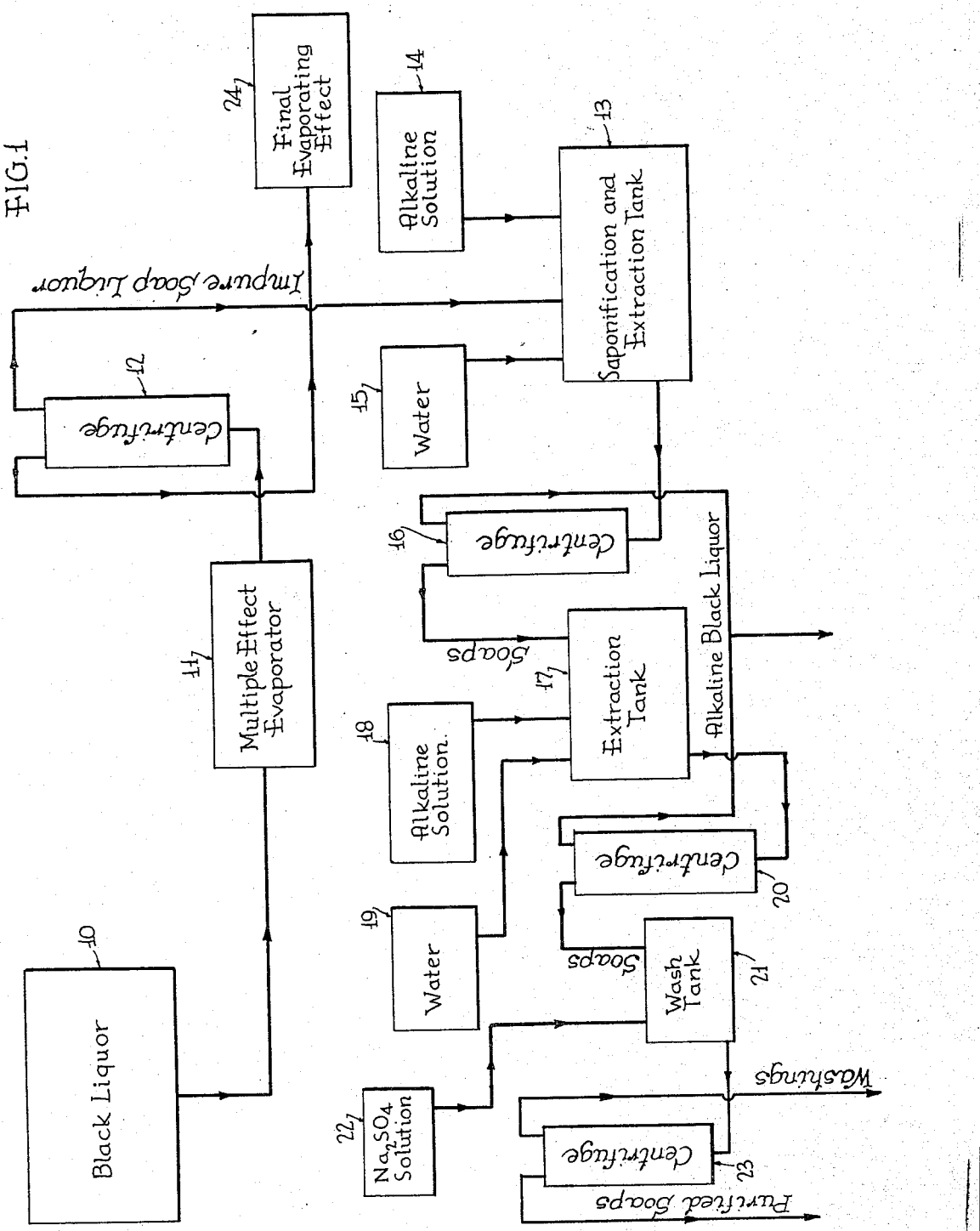
INVENTORS:
Ashton T. Scott &
Charles R. Brown
BY Maurice A. Crews
ATTORNEY

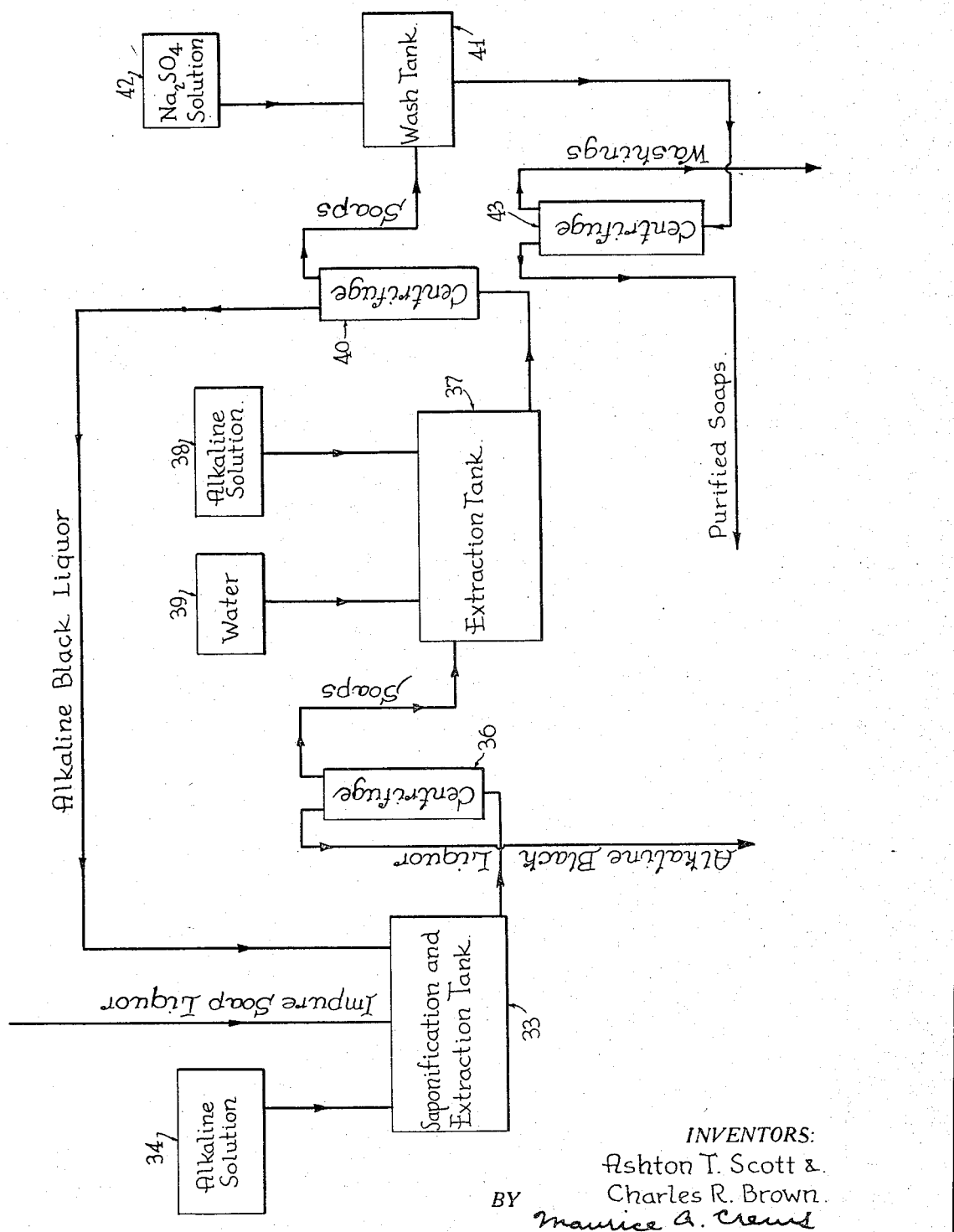

Patented Dec. 31, 1940

2,227,203

UNITED STATES PATENT OFFICE 2,227,203

MANUFACTURE OF SOAP

Ashton T. Scott, Ardmore, Pa., and Charles R. Brown, Champaign, Ill., assignors to The Sharples Corporation, Philadelphia, Pa.

Application November 5, 1938, Serial No. 239,114

10 Claims. (Cl. 260—97.5)

The present invention pertains to the manufacture of soaps from black liquor obtained as a by-product in the manufacture of paper pulp. In the soda or Kraft processes of making paper pulp, wood is digested with alkaline liquors and the treated pulp is washed with water. At the conclusion of the chemical treatment and washing steps, the so-called black liquor obtained contains soaps of fatty acids and resin acids, esters of such acids, lignin and other constituents.

Attempts have heretofore been made to obtain soaps from this black liquor in the form of so-called tall oil soaps and to recover fatty acids from these soaps, but the soaps so obtained and the fatty acids derived therefrom have been of poor quality because of contamination with lignin and other constituents of the black liquor from which they are derived. These prior art attempts are also subject to the criticisms that a high yield of soaps from the black liquor is not effected and that the processes of refining are rendered unnecessarily complicated by the presence of lignin and other impurities in the re-covered soaps.

An object of the present invention has been to provide a process which affords a much higher yield of recovered soaps and recovered fatty acids than these prior art processes.

A second object of the invention has been to provide a process by which the soaps and fatty acids can be recovered from black liquor in a pure condition by a much more economical procedure than is accomplished in prior art processes.

Further objects and advantages of the invention will be obvious from a reading of the subjoined specification in the light of the attached flow sheet, in which, Figure 1 illustrates one embodiment of the invention, and Figure 2 illustrates an alternative embodiment.

Referring to the drawings by reference characters, black liquor from tank 10, which is in a heated condition as it comes from the digestion and pulp washing steps of the process, may be passed through a multiple effect evaporator 11 until the concentration of dry substance soluble constituents in the black liquor is increased to a point between 30 and 50% (e. g. 40%). This step of multi-effect evaporation may be the step ordinarily used in concentrating the black liquor in the practice of the soda or sulfate process. When this degree of concentration of the black liquor is attained, the temperature of the black liquor is usually between 160 and 180° F. Black liquor of this concentration and temperature may be obtained from the third effect body of a quadruple effect evaporator such as is conventionally employed for concentrating black liquor. At this temperature and degree of dry substance concentration, the soaps are substantially completely precipitated from solution in the black liquor.

The so-concentrated black liquor may be passed at this stage of concentration to a centrifugal separator 12 of the liquid balance type in order to remove these precipitated soaps from the black liquor. The centrifugally separated black liquor can then be passed to the final evaporating effect and further processed in a manner well known in this art. The substantially complete removal of the soaps from the black liquor at this stage of the process lowers the viscosity of the black liquor and makes possible the concentration of the black liquor to a higher density in the final evaporating effect 24, thereby introducing an economy in the processing of this material for the recycling to the digestion step of the pulp making process.

The soaps separated in centrifuge 12 will contain a considerable quantity of lignin and other constituents of the black liquor which are undesirable in the purified soaps and fatty acids to be produced therefrom in accordance with the invention. They will also contain a substantial proportion of material that can be saponified to produce further soap. A particular feature of the invention consists in the procedure adopted for recovering further soaps from this material and in freeing the recovered soaps from these other impurities with which they are contaminated.

It has heretofore been assumed that black liquor contains no material which can be further saponified. We believe that the discovery has first been made by us that this liquor contains material which has not been saponified in the pulp digestion process. A further discovery made by us which has an important bearing on the present invention has been that these materials if not saponified act as impediments to the separation of other impurities from the soaps.

The impure soap from the centrifuge 12 is passed to a saponification and extraction tank 13. This impure soap may be first treated with hot water from tank 15 to effect complete solution of the soaps, lignin, and other constituents of the impure soap. When such solution has been effected, alkaline solution from tank 14 is added to the tank 13. The solution in tank 13 is heated together with this alkaline solution for a sufficient period of time to effect thorough saponification of the remaining saponifiable constituents of the impure soap liquor. Such treatment may involve heating the material to the boiling point for a period of approximately two hours, or alternatively to a higher temperature under super-atmospheric pressure.

After the constituents of the impure soap have been completely saponified, a further quantity of alkaline solution of appropriate strength is added to the tank 13 until the aqueous content of the tank 13 contains a quantity of alkali equivalent to a caustic soda solution of 5 to 10% concentration. This further addition of caustic soda effects a precipitation of soap from the aqueous phase and extraction of the lignin and other undesired constituents into the caustic soda solution.

After sufficient caustic soda has been added to obtain this effect, the mixture from the tank 13 may be fed to a centrifugal separator 16 of the same type as the centrifugal separator 12 described above. The soaps from the saponification and extraction tank 13 are obtained as the lighter effluent from the centrifuge 16, and an alkaline black liquor is obtained as the heavier effluent.

The soaps discharged from the centrifuge 16 may next be passed to an extraction tank 17 for further purification. In this extraction tank, hot water from tank 19 may first be added until the soaps and impurities are again completely dissolved in the aqueous liquid. After this condition has been attained, the alkaline solution from tank 18 is added to extraction tank 17 until a condition of alkalinity equivalent to a caustic soda solution of between 5 and 10% concentration is attained. When this condition prevails, the soaps will be again precipitated from solution and further impurities extracted in the caustic soda solution. The mixture from extraction tank 17 may be passed to a centrifuge 20 of the same type as centrifuges 12 and 16 described above. This centrifuge will operate in the same manner as centrifuge 16 to discharge as separate effluents soaps and an alkaline black liquor. The alkaline black liquor from centrifuge 20 may be combined with the alkaline black liquor from centrifuge 16 for further processing. It is obvious that these purification steps with alkali may be repeated as many times as necessary or desirable.

The soaps discharged from the centrifuge 20 may be sprung with a mineral acid to recover rosin and fatty acid content, or they may be subjected to further purification as illustrated in Figure 1 of the flow sheet before such springing. These soaps may be further washed for the removal of caustic alkali by passing them to a wash tank 21 and mixing with a solution of a neutral salt such as sodium sulfate from tank 22. The mixture from tank 21 may then be passed to a centrifugal separator 23 of the same type as centrifuges 12, 16 and 20, and separated effluents consisting respectively of purified soaps and wash liquid are discharged from this centrifuge.

While one embodiment of the invention has been described above, it will be obvious that many modifications may be used within the broad principle of the invention. Thus, for example, instead of evaporating the black liquor from tank 10 to a concentration of between 30 and 50% dry substance concentration, this black liquor may be cooled to a point sufficiently low to precipitate the soaps from solution without performing such preliminary concentration, and this cooled mixture may be subjected to centrifugation or gravity settling to produce an impure soap liquor of substantially the same character as that discharged from the centrifuge 12. In such case, the impure liquor so produced will be passed directly to saponification and extraction tank 13 for performance of the ensuing steps of the process. As another alternative, gravity separation could be substituted for the centrifugation accomplished by the centrifuge 12. Such modification is, however, distinctly undesirable as compared with the use of centrifuge 12 as illustrated in Figure 1 of the flow sheet, since the employment of gravity settling at this stage of the process would not produce a soap liquor having as high concentration of soaps as would centrifugation, nor would it effect as thorough removal of the soaps from the black liquor. Such modification would also have a very considerable disadvantage as compared to the use of the centrifuge 12 of Figure 1, in that the liquor would have to be cooled incident to the gravity settling operation and the conservation of heat attained by the use of the centrifuge 12 would be lost. An important advantage in the use of the centrifuge 12 consists in the fact that the material passes very rapidly from multiple effect evaporator 11, and the centrifuge to the final evaporating effect 24 and that, in view of the short time consumed in the centrifuging step, practically no heat is lost by the black liquor incident to this centrifuging step.

The invention may be still further modified by using only an alkaline solution for extraction and saponification in the tank 13 instead of first dissolving the entire mixture in water and thereafter adding alkaline solution. Thus, instead of adding water from tank 15 and thereafter adding alkaline solution from tank 14 only after the impure soap liquor in tank 13 has been entirely dissolved, alkaline solution may be added without preliminary addition of water and may be heated with the other constituents of the tank 13 to effect complete saponification of the saponifiable constituents of the mixture. At the conclusion of this saponification, water may be added to the mixture to throw the entire mass into solution and concentrated alkali thereafter added until the soaps have been precipitated from solution prior to passage through the centrifuge 16. As a still further modification, the process may be practiced without adding water to the tank 13 at any stage of the process, the entire extraction step in this tank being accomplished by means of alkaline solution.

A gravity settling tank may be substituted for the centrifuge 16, although such substitution is not so desirable as the use of the centrifuge 16, since the separation accomplished by gravity is much less efficient than that which can be accomplished by centrifuging the mixture at this stage of the process.

As a further modification, alkaline solution may be used in the extraction step in the extraction tank 17, to the exclusion of water, and a gravity settling tank may be substituted for the centrifuge 20, although this is not so desirable, for the same reasons discussed above in connection with the suggested substitution of a gravity settling tank for the centrifuge 16.

A critical feature of the invention consists in the avoidance of the emulsifying effect on subsequent acid springing of the saponifiable constituents passed to the tank 13 by complete saponification of these constituents.

A second critical feature consists in the addition of further alkali, such as caustic soda solution to this tank, after complete saponification has been attained, until the soaps have been entirely precipitated from solution and the alkaline content of the tank 13 has been raised to such point that a substantially complete separation between soap and alkali soluble impurities is obtained.

A third critical feature of the invention consists in substantially complete removal of impurities in an aqueous alkaline medium thereby avoiding emulsion and other difficulties which would be encountered in case these impurities were not removed prior to springing the soaps with acid.

Figure 2 of the drawings illustrates an embodiment of the invention in which the countercurrent principle is employed in the saponification and extraction steps. In accordance with this figure of the drawings, an impure soap liquor is passed to the saponification and extraction tank 33, which may be similar to the tank 13 illustrated in Fig. 1, and which is operated similarly to the tank 13. Instead of adding water to this tank as in the embodiment of Fig. 1, alkaline black liquor from the secondary centrifuge 40 is added to this tank until the entire mass of material in the tank is in solution. Alkaline solution from tank 34 is thereafter added to tank 33 until the condition of alkalinity necessary to precipitate the soaps and extract impurities has been attained, as in connection with the embodiment of Fig. 1.

The mixture is then passed to a centrifuge 36 which operates exactly similarly to the centrifuge 16 of the embodiment of Fig. 1. The soaps discharged from centrifuge 36 are passed to an extraction tank 37 which receives water from tank 39 and alkaline solution from tank 38 and is operated in the same manner as the operation described with respect to extraction tank 17 of Fig. 1. The mixture from extraction tank 37 is passed to the centrifuge 40 which performs the same function as the centrifuge 20 of Fig. 1. The alkaline black liquor discharged from this second centrifuge 40 is used in the initial dilution of the material in the saponification and extraction tank 33, as described above. The soaps from tank 40 may thereafter be subjected to washing with a neutral salt by the use of the tanks 41 and 42 and centrifuge 43 in the same manner described above with respect to Fig. 1 of the drawings in connection with the use of tanks 21 and 22 and centrifuge 23.

The other modifications described above with respect to Fig. 1 are also applicable to this embodiment of the invention. For example, the alkaline solution may be passed from tank 34 to tank 33 to saponify the saponifiable constituents in that tank before passage of alkaline black liquor from centrifuge 40 to that tank to dissolve the soaps and extract undesired constituents. Similarly, gravity settling tanks may be substituted for centrifuges 36, 40 and 43, or any one of them, just as in connection with the embodiment of Fig. 1.

Still further modifications will be obvious to those skilled in the art and we do not therefore wish to be limited except by the scope of the sub-joined claims.

We claim:

1. In the treatment of black liquor, the process comprising, separating from said black liquor a crude tall oil soap mixture comprising soaps of resin and fatty acids, saponifiable constituents and impurities including lignin, dissolving the mixture so produced in an aqueous liquid, substantially completely saponifying the solution so produced by treatment with alkali at an elevated temperature, adding a sufficient excess of alkali to precipitate soaps from solution and dissolve impurities in the aqueous solution, separating precipitated soaps by subsidence from the mixture so produced, treating the so-separated soaps with an alkali to effect solution of residual impurities, separating said alkaline solution and residual impurities from the so-treated soap by subsidence, and using the impurities separated from the soaps in said last-mentioned separating step in the treatment of a further quantity of the mixture separated in accordance with the first-mentioned separating step in accordance with the steps defined above.

2. In the treatment of a crude tall oil soap mixture containing constituents of black liquor including soaps or resin and fatty acids, saponifiable constituents and impurities including lignin, the steps comprising treating said mixture with a sufficient quantity of alkali at an elevated temperature to substantially completely saponify the saponifiable constituents of the mixture and to precipitate soaps from solution and dissolve impurities in the aqueous alkaline solution, thereafter separating precipitated soaps by subsidence from the mixture so produced, treating the so-separated soaps with an alkali to dissolve residual impurities in said alkali, separating said alkaline solution and residual impurities from the so-treated soap by subsidence, washing the soaps separated by said last-mentioned separating step with a neutral salt, and thereafter separating the wash water from the purified soaps by subsidence.

3. In the treatment of black liquor, the process comprising separating from said black liquor a crude tall oil soap mixture comprising soaps of resin and fatty acids, saponifiable constituents and impurities including lignin, mixing said mixture with an alkali and heating the resulting mixture until the saponifiable constituents are substantially completely saponified, and thereafter separating impurities from the soaps of said mixture.

4. In the treatment of black liquor, the process comprising, separating from said black liquor a crude tall oil soap mixture comprising soaps of resin and fatty acids, saponifiable constituents and impurities including lignin, mixing said mixture with an alkali and heating the resulting mixture until the saponifiable constituents are substantially completely saponified, thereafter adding further alkali until the aqueous content of said mixture has an alkali concentration equivalent to between 5 and 10% concentration of sodium hydroxide and thereafter separating impurities from the soaps of said mixture.

5. In the treatment of black liquor, the process comprising, separating from said black liquor a crude tall oil soap mixture comprising soaps of resin and fatty acids, impurities including lignin, and saponifiable constituents, adding water to said mixture until the constituents of said mixture are dissolved, thereafter mixing said mixture with an alkali and heating the resulting mixture until the substantially completely saponifiable constituents are saponified, and thereafter separating impurities from the soaps of said mixture.

6. In the treatment of black liquor, the process comprising, separating from said black liquor a crude tall oil soap mixture comprising soaps of resin and fatty acids, impurities including lignin, and saponifiable constituents, adding water to said mixture until the constituents of said mixture are dissolved, thereafter mixing said mixture with an alkali and heating the resulting mixture until the substantially completely saponifiable constituents are saponified, and thereafter separating by subsidence impurities from the soaps of said mixture.

7. In the treatment of black liquor, the process comprising, separating from said black liquor a crude tall oil soap mixture comprising soaps of resin and fatty acids, saponifiable constituents and impurities including lignin, mixing said mixture with an aqueous black liquor which has been substantially completely deprived of soaps until said mixture is substantially dissolved, thereafter mixing the resulting solution with an alkali and heating the resulting mixture until the saponifiable constituents are substantially completely saponified, adding a sufficient further quantity of alkali to precipitate soaps from solution and dissolve other impurities in the alkaline solution and finally separating impurities from the soaps of said mixture.

8. In the treatment of a crude tall oil soap mixture containing constituents of black liquor including soaps of resin and fatty acids, saponifiable constituents and impurities including lignin, the steps comprising mixing said mixture with an alkali and heating the resulting mixture until the saponifiable constituents are substantially completely saponified, and thereafter separating impurities from the soaps of said mixture.

9. In the treatment of a crude tall oil soap mixture containing constituents of black liquor including soaps of resin and fatty acids, saponifiable constituents and impurities including lignin, the steps comprising mixing said mixture with an alkali and heating the resulting mixture until the saponifiable constituents are substantially completely saponified, and thereafter separating by subsidence impurities from the soaps of said mixture.

10. In the treatment of a crude tall oil soap mixture containing constituents of black liquor including soaps of resin and fatty acids, saponifiable constituents and impurities including lignin, the steps comprising mixing said mixture wth an alkali and heating the resulting mixture until the saponifiable constituents are substantially completely saponified, and theerafter separating by centrifugal subsidence impurities from the soaps of said mixture.

ASHTON T. SCOTT.
CHARLES R. BROWN.

CERTIFICATE OF CORRECTION.

Patent No. 2,227,203.                                      December 31, 1940.

ASHTON T. SCOTT, ET AL.

It is hereby certified that error appears in the printed specification of the above numbered patent requiring correction as follows: Page 1, first column, line 24, for "re-covered" read --recovered--; page 3, first column, line 18, for "impurites" read --impurities--; same page, second column, line 28, claim 2, for the word "or" read --of--; page 4, first column, lines 3 and 14, claims 5 and 6 respectively, strike out the words "substantially completely" and insert the same before "saponified" in lines 4 and 15, same claims; line 25, claim 7, before "dissolved" insert --completely--; same page, second column, line 25, claim 10, for "wth" read --with--; and that the said Letters Patent should be read with this correction therein that the same may conform to the record of the case in the Patent Office.

Signed and sealed this 10th day of June, A. D. 1941.

(Seal)
                                           Henry Van Arsdale,
                                     Acting Commissioner of Patents.